United States Patent
Nam et al.

(10) Patent No.: US 7,385,651 B2
(45) Date of Patent: Jun. 10, 2008

(54) ARRAY SUBSTRATE FOR LIQUID CRYSTAL DISPLAY DEVICE AND METHOD OF MANUFACTURING THE SAME

(75) Inventors: Seung-Hee Nam, Daegu (KR); Jae-Young Oh, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 120 days.

(21) Appl. No.: 10/697,024

(22) Filed: Oct. 31, 2003

(65) Prior Publication Data

US 2004/0125273 A1 Jul. 1, 2004

(30) Foreign Application Priority Data

Dec. 26, 2002 (KR) ............ 10-2002-0084589
Dec. 30, 2002 (KR) ............ 10-2002-0086985

(51) Int. Cl.
*G02F 1/136* (2006.01)
(52) U.S. Cl. ........................ 349/43; 349/42
(58) Field of Classification Search .......... 349/42, 349/43
See application file for complete search history.

(56) References Cited

U.S. PATENT DOCUMENTS

| | | | | |
|---|---|---|---|---|
| 5,135,608 A | * | 8/1992 | Okutani | 438/584 |
| 5,510,918 A | * | 4/1996 | Matsunaga et al. | 349/149 |
| 5,835,177 A | * | 11/1998 | Dohjo et al. | 349/147 |
| 6,001,539 A | * | 12/1999 | Lyu et al. | 430/317 |
| 6,169,592 B1 | * | 1/2001 | Choi | 349/124 |
| 6,621,537 B1 | * | 9/2003 | Nakamura et al. | 349/43 |
| 2001/0030718 A1 | * | 10/2001 | Yoo et al. | 349/43 |
| 2001/0035527 A1 | * | 11/2001 | Tanaka et al. | 257/59 |
| 2001/0050747 A1 | * | 12/2001 | Hoshino et al. | 349/149 |
| 2002/0071065 A1 | * | 6/2002 | Lee | 349/43 |
| 2002/0074549 A1 | * | 6/2002 | Park et al. | 257/59 |

\* cited by examiner

*Primary Examiner*—Michael H Caley
(74) *Attorney, Agent, or Firm*—McKenna Long Aldridge LLP

(57) ABSTRACT

An array substrate for a liquid crystal display device includes a substrate having a non-display region and a display region gate and data lines crossing each other, a gate electrode connected to the gate line, a gate insulating layer on the gate line and the gate electrode, an active layer on the gate insulating layer over the gate electrode, an ohmic contact layer on the active layer, source and drain electrodes spaced apart from each other on the ohmic contact layer, a pixel electrode connected to the drain electrode and contacting the gate insulating layer, an alignment layer on the pixel electrode, gate and data pads defined as an end portion of the gate and data lines, respectively, and positioned at the non-display region, and gate and data pad terminals on the gate and data pads, respectively. The data pad terminal may extend to the display region.

4 Claims, 7 Drawing Sheets

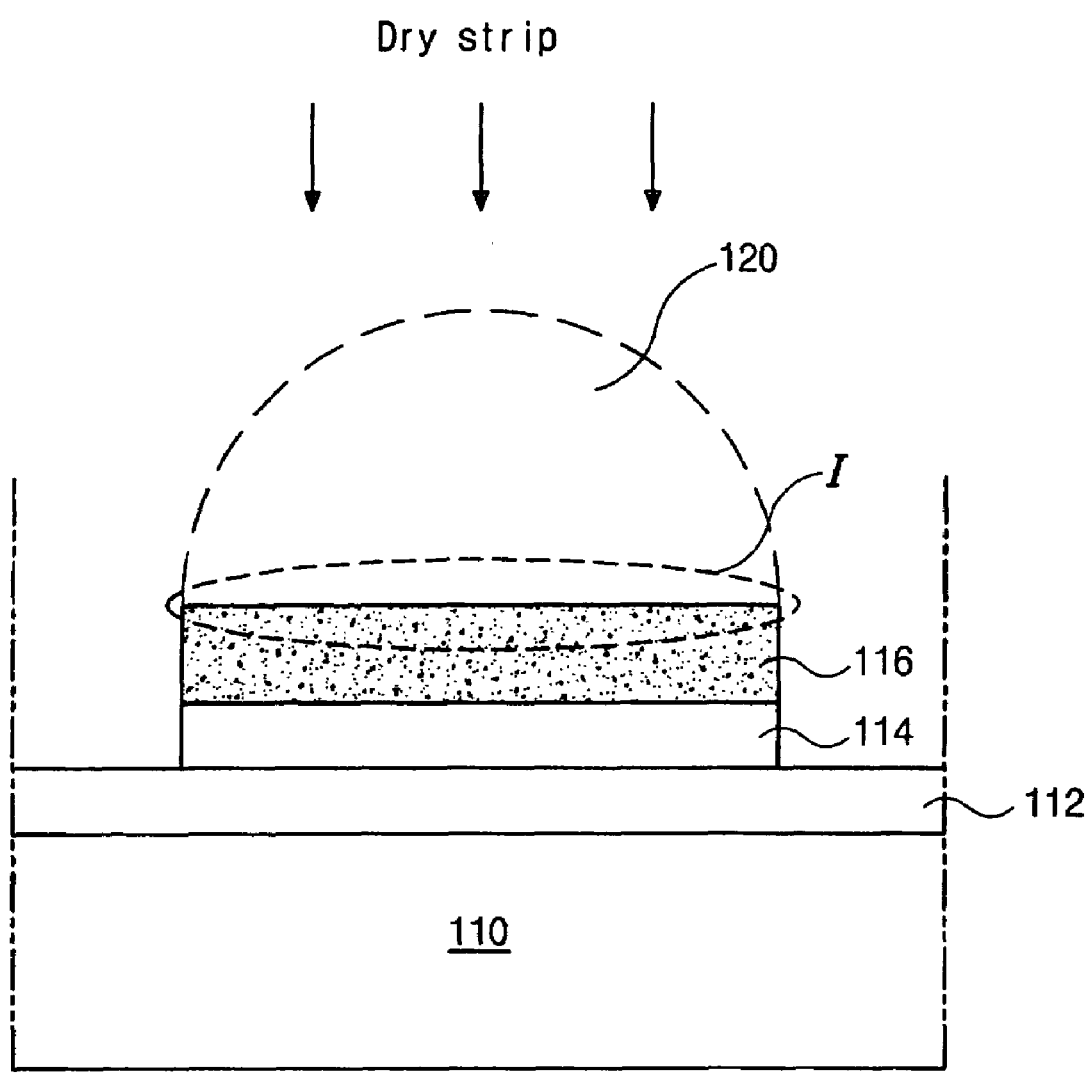

ARRAY SUBSTRATE FOR LIQUID CRYSTAL DISPLAY DEVICE AND METHOD OF MANUFACTURING THE SAME

The present invention claims the benefit of Korean Patent Applications Nos. 2002-84589 and 2002-86985, filed in Korea on Dec. 26 and 30, 2002, respectively, which are hereby incorporated by reference for all purposes as if fully set forth herein.

BACKGROUND OF THE INVENTION

1. Field of the Invention

The present invention relates to a liquid crystal display (LCD) device and more particularly to an array substrate for a liquid crystal display device and a manufacturing method thereof.

2. Discussion of the Related Art

Generally, a liquid crystal display (LCD) device includes two substrates that are spaced apart and face each other with a liquid crystal material layer interposed between the two substrates. Each of the substrates includes electrodes that face each other, wherein a voltage applied to each electrode induces an electric field between the electrodes and within the liquid crystal material layer. Alignment of the liquid crystal molecules of the liquid crystal material layer is changed by varying an intensity or direction of the applied electric field. Accordingly, the LCD device displays an image by varying light transmissivity through the liquid crystal material layer in accordance with the arrangement of the liquid crystal molecules.

FIG. 1 is a cross sectional view illustrating a liquid crystal display (LCD) device according to the related art. In FIG. 1, an LCD device has upper and lower substrates 60 and 10, which are spaced apart from and facing each other, and a liquid crystal material layer 80 interposed and sealed by a sealant 90 between the upper and lower substrates 60 and 10. The LCD device can be divided as a display region A and a non-display region B.

The upper substrate 60 includes a black matrix 62, a color filter layer 64, and a transparent common electrode 68 subsequently disposed on an interior surface thereof. The black matrix 62 includes openings having one of three sub-color filters of red (R), green (G), and blue (B). Below the black matrix 62 there is an overcoat layer 66.

The lower substrate 10, which is commonly referred to an array substrate, has a thin film transistor T having a gate electrode 22, a source electrode 34, and a drain electrode 36. On the gate electrode 22 a gate-insulating layer 24 is formed. On the gate-insulating layer 24 a silicon layer and a doped silicon layer are deposited and patterned into an active layer 26 and an ohmic contact layer 28. The source electrode 34 is connected to a data line 32 and the gate electrode 22 is connected to a gate line (not shown). The gate line and the date line 32 cross each other to define a pixel area P. On the source and drain electrodes 34 and 36 a passivation layer 40 is formed and patterned to have a drain contact hole 42 and a pad contact hole 44. A pixel electrode 52 is formed within the pixel area P to correspond to the sub-color filters (R), (G), and (B), and is electrically connected to the thin film transistor T via a drain contact hole 42. The pixel electrode 52 is made of a light transparent conductive material, such as indium-tin-oxide (ITO).

A data signal is supplied to the source electrode 34 of the thin film transistor T along a data pad 38 and the data line 32. The data pad 38 is formed at one end of the data line 32, and a data pad terminal 54 is connected to the data pad 38 via the pad contact hole 44. The data pad terminal 54 may be formed of the same material as the pixel electrode 53. The data pad 38 and the data pad terminal 54 are positioned in the non-display region B.

On each interior surface, orientation or alignment layers 72 and 74 are positioned. The orientation layers 72 and 74 have an organic material such as polyimide.

Light transmission through the liquid crystal material layer 80 is adjusted by controlling electrical and optical properties of the liquid crystal material layer 80. For example, the liquid crystal material layer 80 includes a dielectric anisotropic material having spontaneous polarization properties such that the liquid crystal molecules form a dipole when the electric field is induced. Thus, the liquid crystal molecules of the liquid crystal material layer 80 are controlled by the applied electric field. In addition, optical modulation of the liquid crystal material layer 80 is adjusted according to the arrangement of the liquid crystal molecules. Therefore, images of the LCD device are produced by controlling light transmittance of the liquid crystal material layer 80 by optical modulation of the liquid crystal material layer 80.

The manufacturing method of the array substrate will be explained. For example, when forming the gate electrode 22, a metal layer is formed by a sputtering method and patterned into the gate electrode 22 using a photolithography method. The photolithography process includes depositing a photoresist layer, exposing the photoresist layer using a patterned mask, removing the exposed portion or the non-exposed portion according to type of the photoresist material, etching the metal layer, and stripping the remaining photoresist portion. The etching method is usually chosen between a wet etching and a dry etching according to the material of being etched. The stripping process uses a stripper having an organic solvent, which is one reason of high cost.

For manufacturing the array substrate, five or six mask or lithography processes are usually adopted. Reducing the number of lithography processes has been a big task to decrease manufacturing cost.

SUMMARY OF THE INVENTION

Accordingly, the present invention is directed to an array substrate for a liquid crystal display device and a manufacturing method thereof that substantially obviates one or more problems due to limitations and disadvantages of the related art.

An advantage of the present invention is to provide an array substrate for a liquid crystal display device and a manufacturing method thereof that shorten manufacturing time and cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as in the appended drawings.

To achieve these and other advantages and in accordance with the purpose of the present invention, as embodied and broadly described, an array substrate for a liquid crystal display device includes a substrate where a non-display region and a display region are defined, gate and data lines crossing each other on the substrate, a gate electrode connected to the gate line, a gate insulating layer on the gate line and the gate electrode, an active layer on the gate insulating layer over the gate electrode, an ohmic contact layer on the active layer, source and drain electrodes spaced apart from each other on the ohmic contact layer, a pixel electrode connected to the drain electrode and contacting the gate insulating layer, an alignment layer on the pixel electrode, gate and data pads defined as an end portion of the gate and data lines, respectively, and positioned at the non-display region, and gate and data pad terminals on the gate and data pads, respectively. The data pad terminal may extend to the display region. The data pad terminal may have the same material as the pixel electrode. The alignment layer may be made of polyimide.

In another aspect of the present invention, a manufacturing method of an array substrate for a liquid crystal display device includes forming a gate electrode on a substrate having a display region and a non-display region, forming a gate insulating layer on the gate electrode, forming an active and an ohmic contact layer on the gate insulating layer over the gate electrode, forming source and drain electrodes, forming a pixel electrode contacting the drain electrode on the gate insulating layer, forming an alignment layer on the pixel electrode and the source and drain electrodes, and forming a data line connected to the source electrode and having a data pad at the non-display region, and forming a data pad terminal contacting the data pad.

The data pad terminal and the pixel electrode can be made at the same time. At least one of the electrodes can be made by a photolithography method. The photoresist used in the photolithography can be removed by a dry strip method. Dry gases used in the dry strip may include $O_2$ as a base gas and $SF_6$ or $CF_4$ as a reactive gas. The ohmic contact layer can be made by a photolithography method. After removing the photoresist used for patterning the ohmic contact layer, an upper surface of the ohmic contact layer can be etched. The alignment layer is formed by a printing method.

In another aspect of the present invention, a manufacturing method of an array substrate for a liquid crystal display device includes forming a thin film transistor having a gate electrode, source and drain electrodes, an active layer, and an ohmic contact layer, forming a pixel electrode contacting the drain electrode, wherein the formation of at least one of the electrodes and the active layer and the ohmic contact layer are processed by a photolithography method using a photoresist, and wherein the photoresist used in the formation is removed by a dry strip method. Dry gases used in the dry strip may include $O_2$ as a base gas and $SF_6$ or $CF_4$ as a reactive gas. After removing the photoresist used for patterning the ohmic contact layer, an upper surface of the ohmic contact layer can be etched.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A to 5D are cross sectional views of a manufacturing method of an ohmic contact layer for the array substrate according to the second embodiment of the invention.

DETAILED DESCRIPTION OF THE PREFERRED EMBODIMENTS

Reference will now be made in detail to the illustrated embodiments of the present invention, example of which is illustrated in the accompanying drawings.

Figure 2:
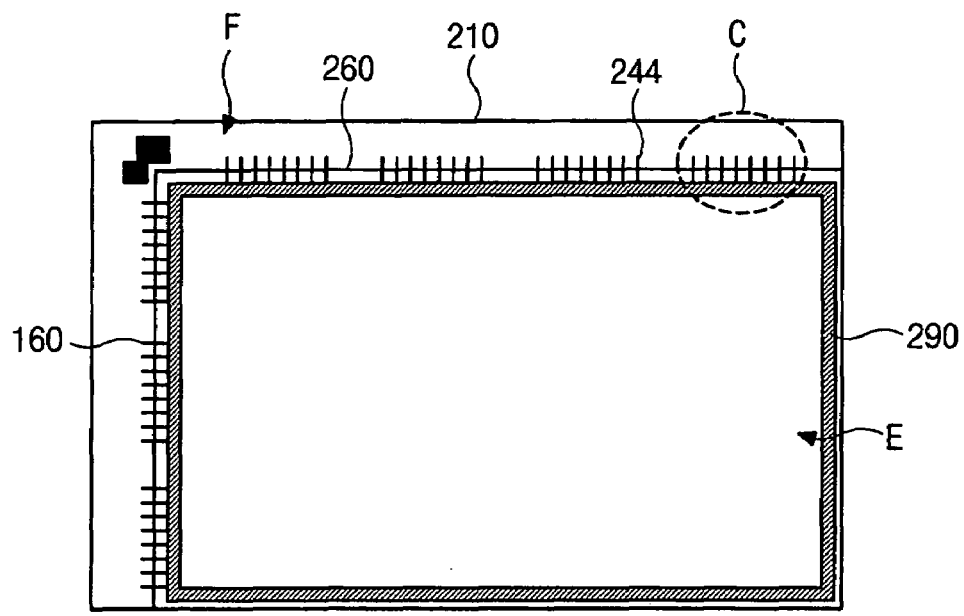
FIG. 2 is a plan view of an LCD device according to the first embodiment of the invention.

FIG. 2 is a plan view of an exemplary liquid crystal display (LCD) device according to the present invention. First and second substrates 210 and 260 are overlapped with a seal pattern 290 interposed between the two substrates 210 and 260. The first substrate 210 is wider than the second substrate 260. The LCD device can be divided as a display region E and a non-display region F. The display region E is surrounded by the seal pattern 290, and the non-display region F has pad portions 160 and 170.

Figure 3:
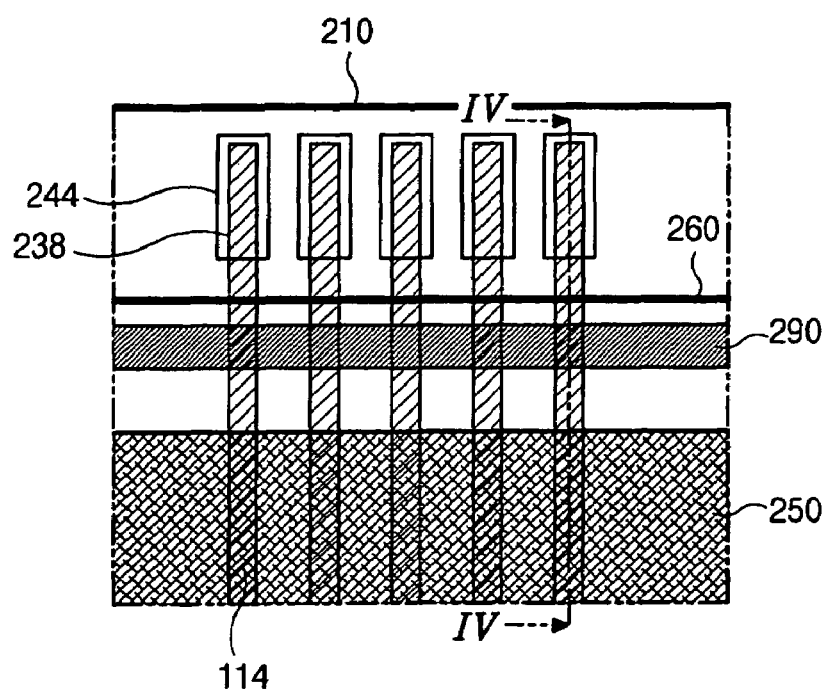
FIG. 3 is an enlarged view of portion C of FIG. 2.
Figure 4:
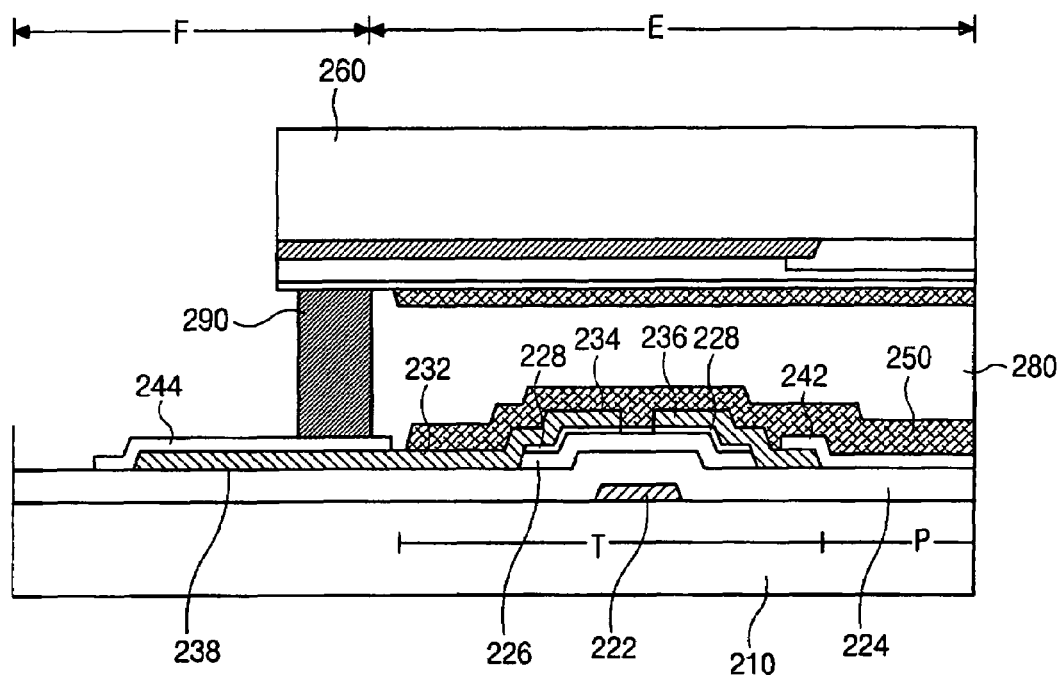
FIG. 4 is a cross sectional view taken along IV-IV of FIG. 3.

FIG. 3 is an enlarged view of a portion C of FIG. 2 and FIG. 4 is a cross sectional view taken along line IV-IV of FIG. 3. On the substrate 210 there is formed a gate electrode 222 by depositing a first metal layer, and patterning the first metal layer through a first mask process. The gate electrode 222 may extend from a gate line (not shown), and the gate pad 169 is located at one end of the gate line.

Alternatively, the first metal layer may include a double layer structure composed of a first layer including aluminum or an aluminum alloy that has relatively low resistance and a second layer including a metal material that can protect the first layer from chemical and thermal degradation, such as chromium (Cr) and molybdenum (Mo).

Next, a gate insulating layer 224, an amorphous silicon layer, and a doped amorphous silicon layer are subsequently deposited on the substrate 210 and the gate electrode 222. In addition, a photolithography process is carried out to form an active layer 226 and an ohmic contact layer 228. On the ohmic contact layer 228 a second metal layer is formed and patterned to form a data line 232 having a data pad 238 at the non-display region F and a source electrode 234, and a drain electrode 236 spaced apart from the source electrode 234 on the ohmic contact layer 228. The gate insulating layer 224 is made of an inorganic insulating material, such as silicon nitride (SiNx) and silicon oxide (SiO2), and the second metal layer 32 may be formed of chromium (Cr) or molybdenum (Mo).

Next, a pixel electrode 242 is formed on the gate insulating layer 224 and on the drain electrode 236 such that the pixel electrode 242 is connected to the drain electrode 236 by depositing a transparent conductive material, such as indium-tin-oxide (ITO) or indium-zinc-oxide (IZO), and patterning the transparent conductive material using a photolithography method. At this time, a data pad terminal 244 contacting the data pad 238 can be formed at the same time. The data pad terminal 244 may extend to the display region E. If it ends before the seal pattern 290, a portion between the end of the data pad terminal 244 and the seal pattern 290 is exposed and can be corroded by electricity.

On the pixel electrode 242 at the display region E, an alignment layer 250 (e.g., polyimide layer) is formed by printing and then, the layers are rubbed to form grooves extending in the same direction or different directions for orientating the liquid crystal molecules toward a specific direction or directions.

Figure 1:
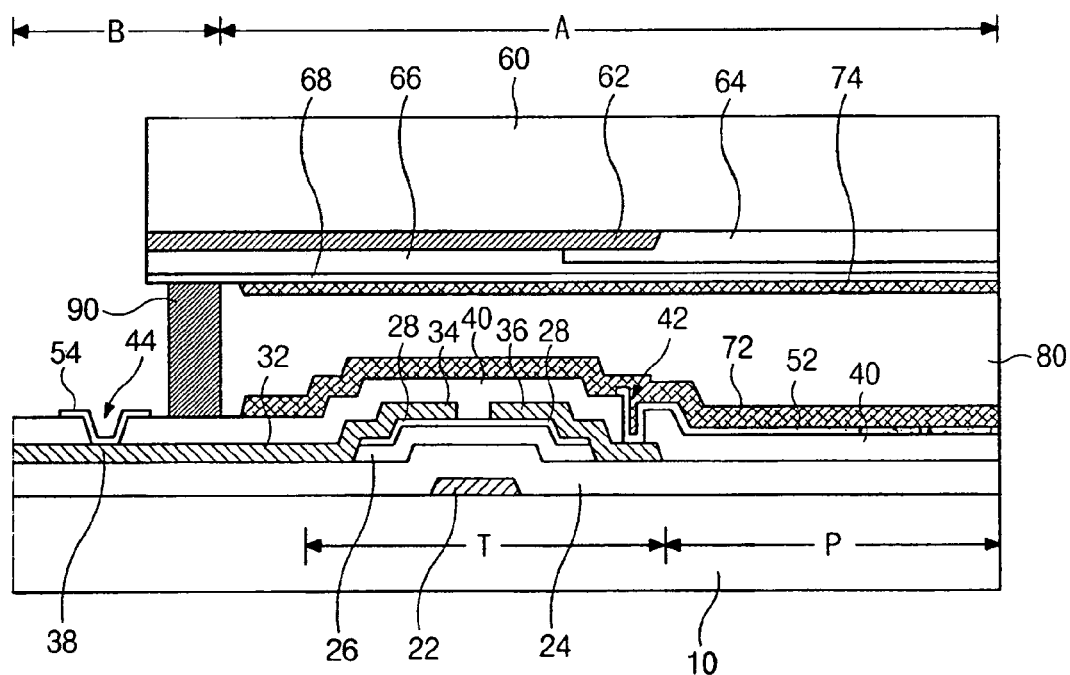
FIG. 1 is a cross sectional view of a liquid crystal display (LCD) device according to the related art.

Now, detailed description of forming each layer will be explained. When forming a gate electrode 222 of FIG. 4, a first metal layer is deposited by a sputtering method, and using a photolithography method the patterned gate electrode 22 is formed. As in the related art photolithography process, the photoresist layer is deposited, exposed to light using a mask, and developed to leave a patterned photoresist layer. Then the metal layer is etched by a dry etching method, and the remaining photoresist layer is removed by a dry strip method. Dry gases used in the dry strip method may include $O_2$ as a base gas and $SF_6$ or $CF_4$ as a reactive gas. The reactive gases used in the dry etching method may include a mixture of $CCl_4$ or $Cl_2$. The dry etching and the dry strip methods can be processed in the same chamber. This process can be adapted to formation of the data line 232 and the pixel electrode 242. Furthermore, this can be adapted to forming a contact hole, for example, a drain contact hole or pad contact hole, as shown in FIG. 1, though there is no contact hole in FIG. 4.

Figure 5A:
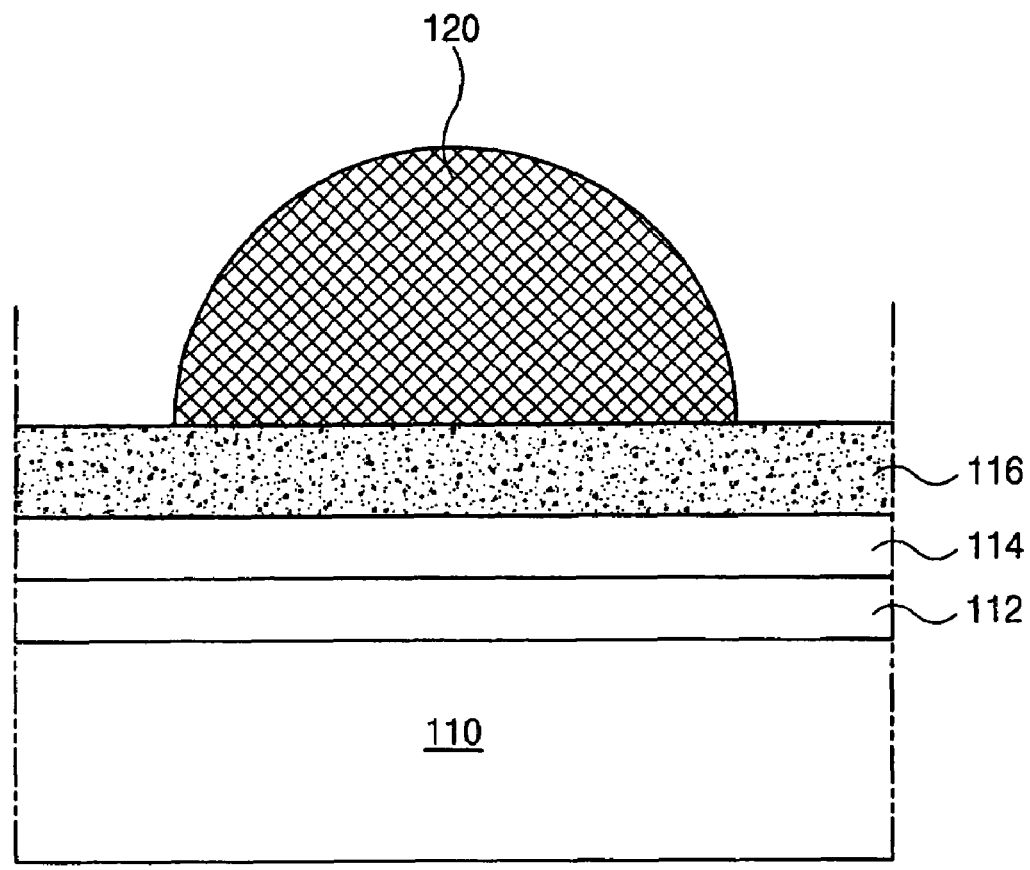
Figure 5B:
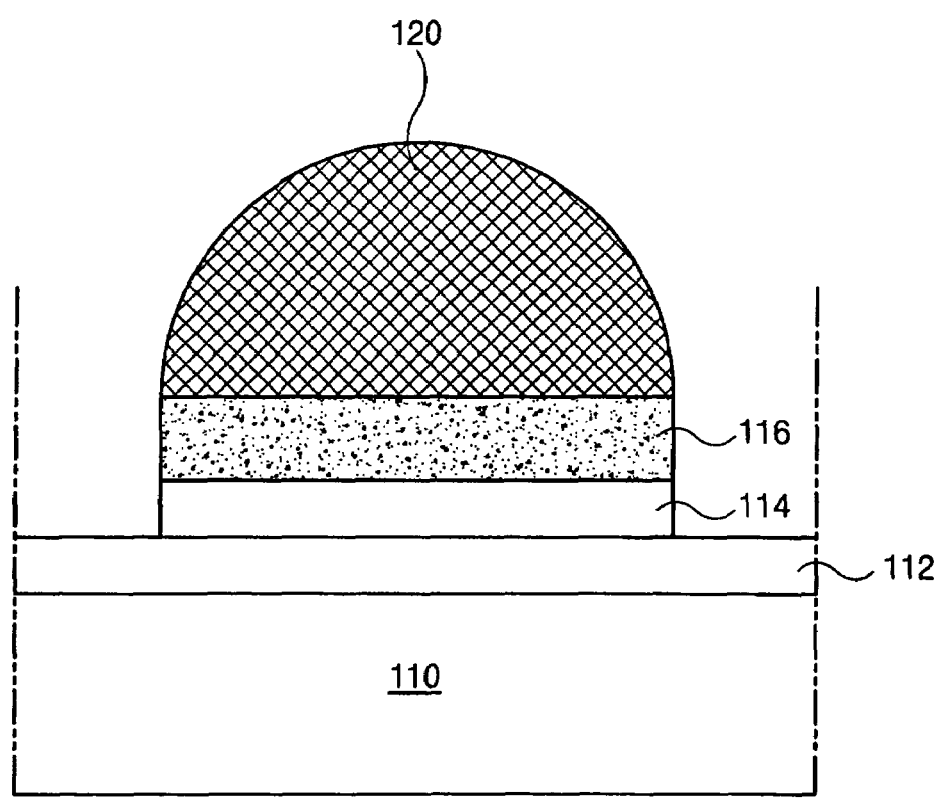

Alternatively, a process of forming an active layer and an ohmic contact layer may be different from that explained just before. For easy understanding, other elements, such as the gate electrode, are omitted in the drawings. The gate insulating layer 112, the silicon layer 114 and a doped silicon layer 116 are formed on the substrate 110 and, as forming electrode, after developing the photoresist layer 120 as shown in FIG. 5A, a dry etching method is carried out as shown in FIG. 5B. And preferably in the same chamber, a dry strip method using dry gases similar to those discussed above is carried out as in FIG. 5C. At this point, when performing the dry strip, $O_2$ gas can damage the surface area I of the doped layer 116, which deteriorates the characteristic of the thin film transistor.

Figure 5D:
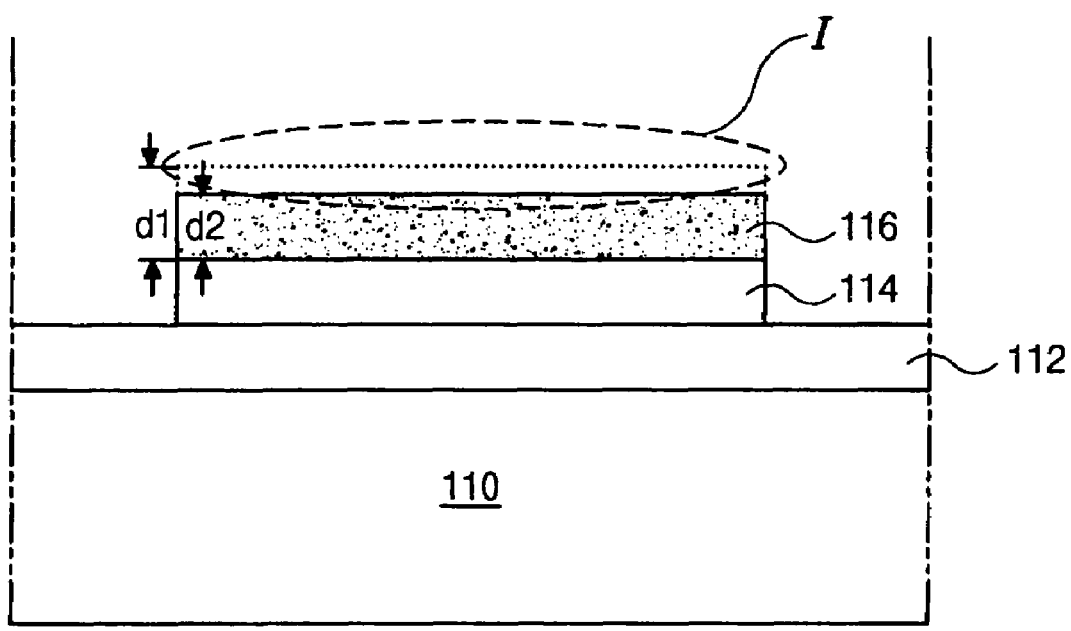

Thus, preceding the dry strip method, the surface area I of the ohmic contact layer 116 may be etched by a dry etching method. And for the purpose, regarding the second etch or under-etch of the surface, the thickness of a deposited doped layer d1 is between about 400 and about 1,000 Angstroms. At the second etching step, the surface of the ohmic contact layer is etched by between about 100 and about 700 Angstroms as indicated by d1-d2 in FIG. 5D.

By adopting the second embodiment of the invention, a solvent type stripper is not necessary for stripping the photoresist layer, and thus the manufacturing cost can be decreased.

It will be apparent to those skilled in the art that various modifications and variation can be made without departing from the spirit or scope of the invention. Thus, it is intended that the present invention cover the modifications and variations of this invention provided they come within the scope of the appended claims and their equivalents.

What is claimed is:

1. A method of manufacturing an array substrate for a liquid crystal display device comprising:

forming a thin film transistor having a gate electrode, source and drain electrodes, an active layer, and an ohmic contact layer;

forming a pixel electrode contacting the drain electrode, wherein the formation of at least one of the electrodes, the active layer, and the ohmic contact layer are processed by a photolithography method using photoresists, wherein the ohmic contact layer is etched by a dry etching process in a chamber, and wherein a photoresist used in the formation of the ohmic contact layer is removed by a dry strip method using dry gases in the chamber and wherein an upper surface of the ohmic contact layer is etched after the dry strip method.

2. The method according to claim 1, wherein the dry gases used in the dry strip include $O_2$ as a base gas and $SF_6$ or $CF_4$ as a reactive gas.

3. The method according to claim 1, wherein the upper surface of the ohmic contact layer is etched to a depth of between 100 and 700 Angstroms.

4. The method according to claim 3, wherein a thickness of the ohmic contact layer before etching is between about 400 and about 1,000 Angstroms.

* * * * *